(12) United States Patent
Lienau et al.

(10) Patent No.: US 9,885,254 B2
(45) Date of Patent: Feb. 6, 2018

(54) MID TURBINE FRAME INCLUDING A SEALED TORQUE BOX

(71) Applicant: United Technologies Corporation, Hartford, CT (US)

(72) Inventors: Jeffrey J. Lienau, Wethersfield, CT (US); Dustin W. Davis, Marlborough, CT (US); Jonathan Lemoine, Vernon, CT (US); Kevin Zacchera, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 272 days.

(21) Appl. No.: 14/695,323

(22) Filed: Apr. 24, 2015

(65) Prior Publication Data
US 2016/0312659 A1 Oct. 27, 2016

(51) Int. Cl.
| F01D 9/04 | (2006.01) |
| F01D 25/28 | (2006.01) |
| F01D 9/06 | (2006.01) |
| F01D 11/00 | (2006.01) |
| F01D 25/16 | (2006.01) |
| F01D 25/12 | (2006.01) |

(52) U.S. Cl.
CPC ............ *F01D 25/28* (2013.01); *F01D 9/042* (2013.01); *F01D 9/065* (2013.01); *F01D 11/003* (2013.01); *F01D 25/12* (2013.01); *F01D 25/162* (2013.01); *F05D 2220/3213* (2013.01); *F05D 2240/58* (2013.01); *F05D 2260/20* (2013.01); *Y02T 50/675* (2013.01)

(58) Field of Classification Search
None
See application file for complete search history.

(56) References Cited

U.S. PATENT DOCUMENTS

| 3,572,733 | A | 3/1971 | Howald et al. |
| 7,195,447 | B2 | 3/2007 | Moniz et al. |
| 8,061,969 | B2 | 11/2011 | Durocher et al. |
| 8,091,371 | B2 | 1/2012 | Durocher et al. |
| 2005/0199445 | A1* | 9/2005 | Zalewski ............ F01D 25/183 184/6.5 |
| 2006/0093465 | A1 | 5/2006 | Moniz et al. |
| 2008/0134687 | A1* | 6/2008 | Kumar ................ F01D 25/162 60/796 |

(Continued)

FOREIGN PATENT DOCUMENTS

| EP | 3026222 | 6/2016 |
| WO | 2014051658 | 4/2014 |

(Continued)

OTHER PUBLICATIONS

European Search Report for Application No. 16166717.5 dated Jul. 21, 2016.

*Primary Examiner* — Dwayne J White
*Assistant Examiner* — Theodore Ribadeneyra
(74) *Attorney, Agent, or Firm* — Carlson, Gaskey & Olds, P.C.

(57) ABSTRACT

A mid-turbine frame for a gas turbine engine includes an inner frame case defining a sealed torque box cavity. The mid-turbine frame also includes multiple spokes protruding radially outward from the inner frame case. The mid-turbine frame also includes at least one service line connected to the inner frame case.

14 Claims, 4 Drawing Sheets

(56) References Cited

U.S. PATENT DOCUMENTS

| | | |
|---|---|---|
| 2010/0135770 A1 | 6/2010 | Durocher et al. |
| 2010/0135786 A1* | 6/2010 | Manteiga ................ F01D 9/065 |
| | | 415/232 |
| 2010/0275572 A1* | 11/2010 | Durocher ................ F01D 9/065 |
| | | 60/39.08 |
| 2011/0079019 A1 | 4/2011 | Durocher et al. |
| 2011/0081237 A1 | 4/2011 | Durocher et al. |
| 2011/0189000 A1 | 8/2011 | Vedhagiri et al. |
| 2012/0011824 A1* | 1/2012 | Cigal ...................... F01D 9/065 |
| | | 60/39.08 |
| 2013/0028718 A1* | 1/2013 | Strom ..................... F01D 9/065 |
| | | 415/182.1 |
| 2013/0094951 A1 | 4/2013 | McCaffrey |
| 2013/0115057 A1* | 5/2013 | Suciu .................... F01D 25/162 |
| | | 415/170.1 |
| 2013/0115079 A1* | 5/2013 | Farah ........................ F01D 9/06 |
| | | 415/214.1 |
| 2013/0189071 A1 | 7/2013 | Durocher et al. |
| 2013/0219919 A1 | 8/2013 | Suciu et al. |
| 2013/0259646 A1* | 10/2013 | Feindel ................ F01D 21/003 |
| | | 415/118 |
| 2014/0013770 A1* | 1/2014 | Farah ..................... F01D 25/16 |
| | | 60/796 |
| 2014/0102110 A1 | 4/2014 | Farah et al. |

FOREIGN PATENT DOCUMENTS

| | | |
|---|---|---|
| WO | 2014051672 | 4/2014 |
| WO | 2014052007 | 4/2014 |

\* cited by examiner

MID TURBINE FRAME INCLUDING A SEALED TORQUE BOX

TECHNICAL FIELD

The present disclosure relates generally to mid-turbine frames for a gas turbine engine, and more specifically to a mid-turbine frame including a sealed torque box.

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive rotation of the compressor and the fan section.

A mid-turbine frame (MTF) is positioned between a high pressure turbine stage and a low pressure turbine stage in the gas turbine engine. The MTF supports one or more bearings and transfers bearing loads from an inner portion of the gas turbine engine to an outer engine frame. The MTF also serves to route air from the high pressure turbine stage to the low pressure turbine stage.

SUMMARY OF THE INVENTION

In one exemplary embodiment, a mid-turbine frame for a gas turbine engine includes an inner frame case defining a sealed torque box cavity, a plurality of spokes protruding radially outward from the inner frame case, and at least one service line connected to the inner frame case.

In another exemplary embodiment of the above mid-turbine frame, the plurality of spokes are distributed circumferentially about the inner frame case, and wherein a joint between a radially inward end of each of the spokes and the inner frame case is sealed such that fluid transfer into the torque box at the joint is minimized.

In another exemplary embodiment of any of the above mid-turbine frames, each of the spokes includes a cooling passage extending from a radially outward end of the spoke at least partially toward the inner frame case.

In another exemplary embodiment of any of the above mid-turbine frames, each of the spokes further includes a redirection tube directing cooling fluid flowing through the cooling passage aft such that the cooling fluid bypasses the torque box.

In another exemplary embodiment of any of the above mid-turbine frames, each of the cooling passages extends to the inner frame case, and wherein an opening between the cooling passage and the torque box is sealed via a plug seal.

In another exemplary embodiment of any of the above mid-turbine frames, the at least one service line is connected to the inner frame case via a connection feature, the connection feature interfacing the service line with a corresponding bearing support passage in the torque box.

In another exemplary embodiment of any of the above mid-turbine frames, the connection feature includes: a flange portion and an extension portion, the extension portion extending radially into the bearing support passage, a seal plate radially outward of the flange portion, and a seal element sealing the seal plate to the inner frame case.

In another exemplary embodiment of any of the above mid-turbine frames, the seal element sealing the seal plate to the inner frame case is a piston seal.

Another exemplary embodiment of any of the above mid-turbine frames, further includes a service line seal disposed between an outward facing surface of the extension portion and an inward facing surface of the bearing support passage.

In another exemplary embodiment of any of the above mid-turbine frames, the bearing support passage includes at least a first opening for providing fluid from the bearing support passage to a component disposed radially inward of the mid-turbine frame.

In another exemplary embodiment of any of the above mid-turbine frames, the at least a first opening is sealed to the inner frame case, such that fluid passing through the opening does not pass into the torque box.

In another exemplary embodiment of any of the above mid-turbine frames, the inner frame case is configured such that all cooling air provided to an engine segment adjacent to the inner frame case bypasses the torque box.

An exemplary method according to one embodiment includes sealing a torque box such that passage of fluid from a mid-turbine frame into the torque box is minimized, and sealing the torque box such that passage of fluids inside the torque box to adjacent portions of a gas turbine engine is minimized.

Another embodiment of the above exemplary method further includes providing cooling air to a turbine section through a mid-turbine frame, the cooling air bypassing a torque box of the mid-turbine frame.

In another embodiment of any of the above exemplary methods providing cooling air to a turbine section through a mid-turbine frame, the cooling air bypassing a torque box of the mid-turbine frame includes passing cooling air through a cooling passage in at least one spoke and redirecting the cooling air from the spoke to the turbine section via a redirection tube prior to the cooling air entering the torque box.

Another embodiment of any of the above exemplary method further includes sealing a radially inward end of the cooling passage such that fluid is not exchanged between the torque box and the cooling passage.

Another embodiment of any of the above exemplary method further includes sealing every opening in the torque box.

A gas turbine engine according to one exemplary embodiment includes a primary fluid flow path defined at least in part by a compressor section, a combustor section, and a turbine section, a mid-turbine frame disposed in the turbine section between a first turbine portion and a second turbine portion, the mid-turbine frame structurally supporting a bearing associated with the first turbine portion and providing cooling air to the second turbine portion, and wherein the mid-turbine frame includes an inner frame case defining a sealed torque box cavity, a plurality of spokes protruding radially outward form the inner frame case, and at least one service line connected to the inner frame case.

In another exemplary embodiment of the above gas turbine engine, the at least one service line connects to a bearing support passage in the sealed torque box such that fluid is passed through the torque box through the bearing support passage to the bearing.

In another exemplary embodiment of any of the above gas turbine engines each opening in the sealed torque box is sealed such that fluid exchange between the torque box and fluid external to the torque box is minimized.

These and other features of the present invention can be best understood from the following specification and drawings, the following of which is a brief description.

DETAILED DESCRIPTION OF AN EMBODIMENT

Figure 1:
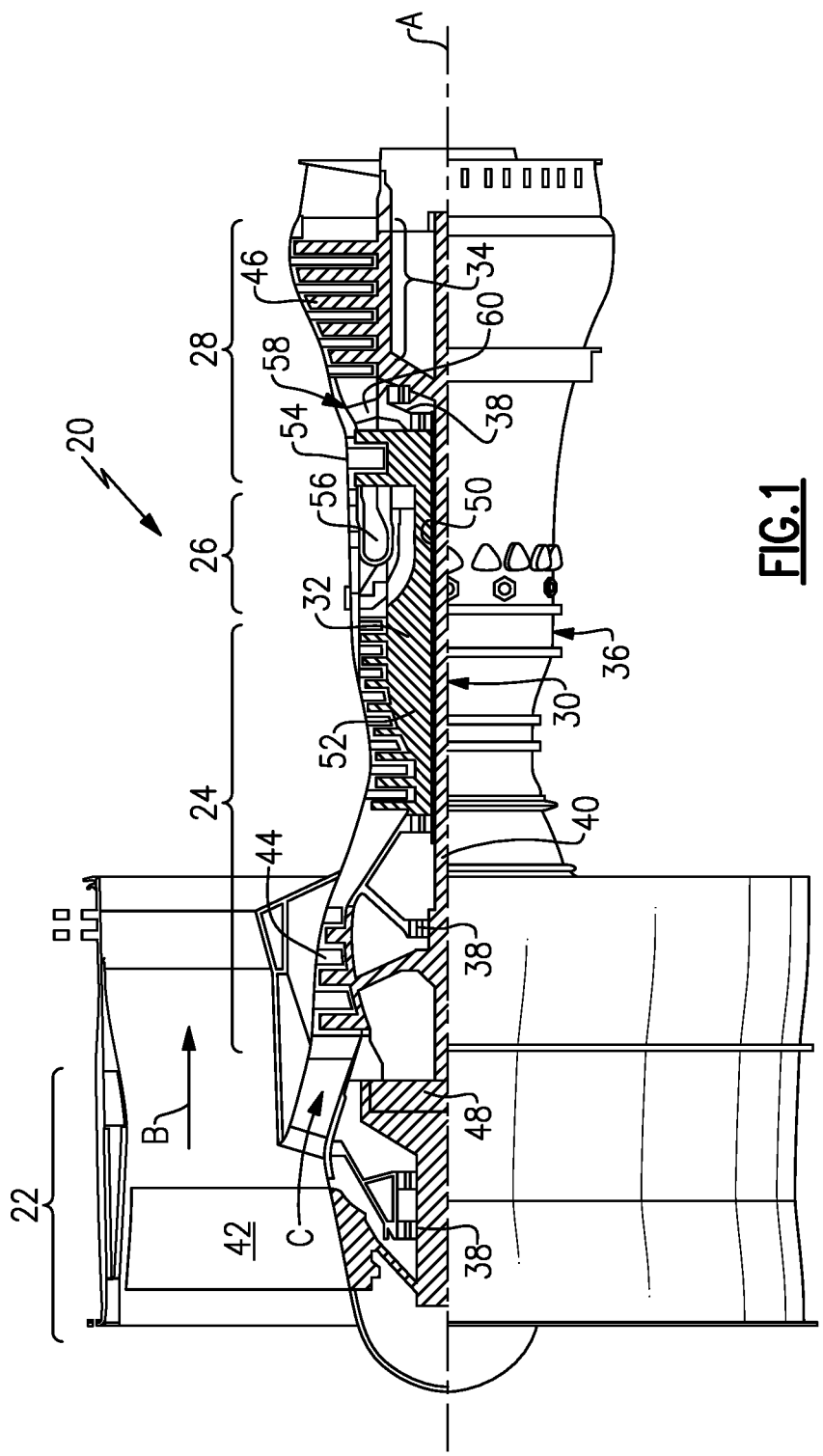
FIG. 1 schematically illustrates a gas turbine engine according to one example.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (1066.8 meters). The flight condition of 0.8 Mach and 35,000 ft (1066.8 m), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{\wedge}0.5$. The "Low corrected fan tip speed" as disclosed herein according to one non-limiting embodiment is less than about 1150 ft/second (350.5 m/s).

The exemplary gas turbine engine 20 described above includes a mid-turbine frame (MTF) 57 that has an inner frame case. The inner frame case surrounds and supports a high spool bearing. Defined within the inner frame case is a cavity referred to as a torque box. The mid-turbine frame 57 is positioned between the low pressure turbine section 46 and the high pressure turbine section 54. As a result of the position of the mid-turbine frame 57 in the flow path, the mid-turbine frame 57 is exposed to high temperatures.

In order to pass oil through the primary flow path to the radially inward portions of the gas turbine engine 20, such as a high spool bearing supported by the mid-turbine frame 57, service lines pass through the torque box.

In some designs, cooling air for the low pressure turbine is fed into the torque box, and directed from the torque box to the low pressure turbine. In the event that an oil leak from the bearing compartment, or the service lines occurs, oil can leak into the torque box. In systems directing cooling air through the torque box to the low pressure turbine, compounds, such as oil, within the torque box can be directed toward the low pressure turbine along the same flow path as the cooling air.

Figure 2:
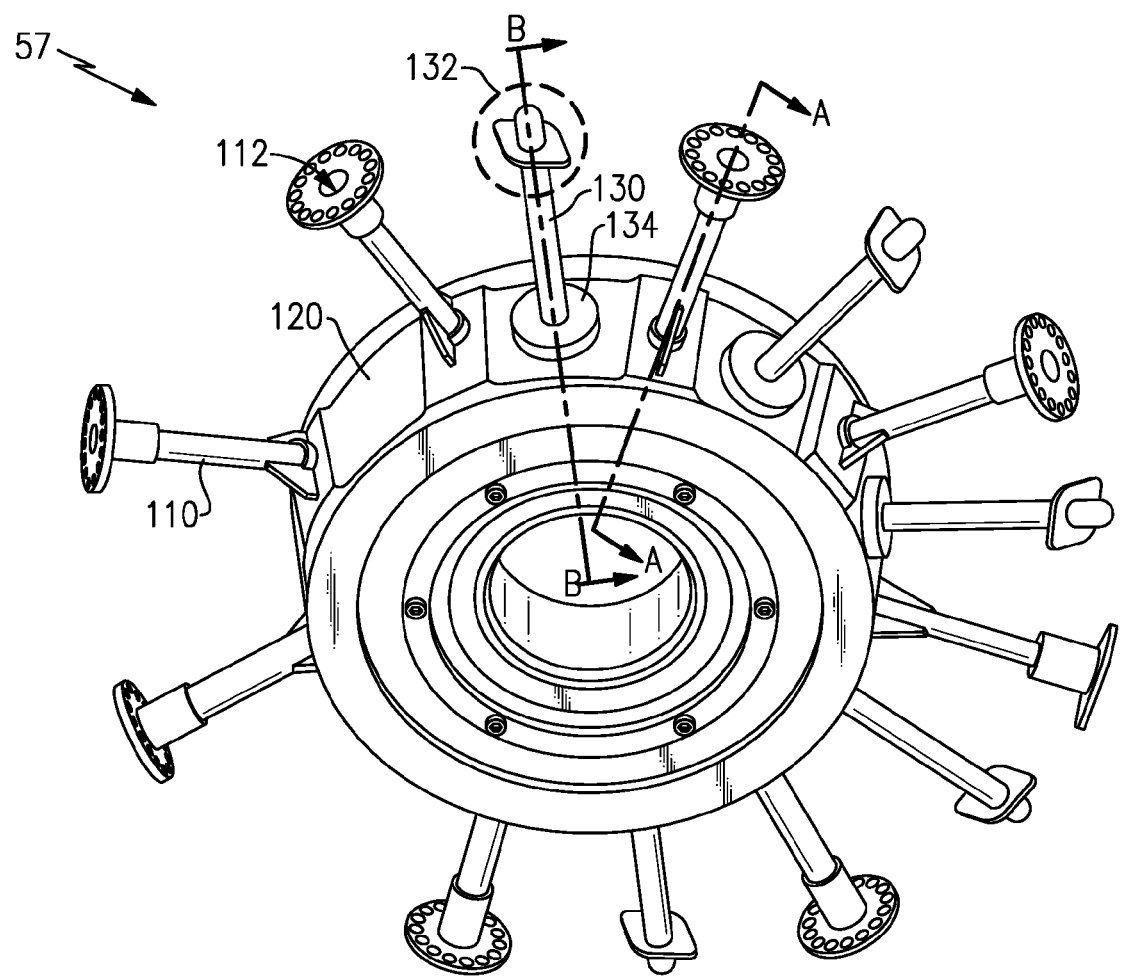
FIG. 2 schematically illustrates an isometric view of an exemplary mid-turbine frame for a gas turbine engine.

FIG. 2 schematically illustrates an isometric view of an exemplary mid-turbine frame 57 for a gas turbine engine, such as the gas turbine engine 20 of FIG. 1. The mid-turbine frame 57 includes multiple spokes 110 extending radially outwardly from an inner frame case 120 and distributed circumferentially about the inner frame case 120. Each of the spokes 110 is hollow, and includes a cooling passage 112 allowing cooling air to be passed radially inward toward the torque box defined within the inner frame case 120. A radially outward end of each spoke 110 includes a flange 114, or other connection feature, for connecting the spoke 110 to an engine case and to a cooling air system. In addition to including a cooling passage 112 for providing cooling air to the low pressure turbine, each of the spokes 110 structurally supports the inner frame case 120. The inner frame case 120, in turn, structurally supports a high spool bearing (not pictured) disposed radially inward of the inner frame case 120. Alternatively, the mid-turbine frame 57 can support different bearing systems depending on the structural needs of a given turbine engine including the mid-turbine frame 57.

Also protruding radially outward from the inner frame case 120 are multiple service lines 130. Each of the service lines 130 includes a connection feature 132 at a radially outward end of the service line 130. The connection feature 132 can be any known connection feature type and allows the service line 130 to be fluidly connected to an oil source radially outward of the primary flow path. In alternative systems, fluids distinct from oil can be passed through one or more of the service lines 130. At the radially outward surface of the inner frame case 120, each service line 130 passes through a corresponding service line seal 134 into the torque box. The service line 130 exits the torque box at a radially inward surface through a corresponding service line seal, and provides the oil to the high spool bearing, or any other system radially inward of the mid-turbine frame 57. The torque box 140 is sealed at each opening for the service line 130 pass through, and at the radially inner end of each spoke 110.

Further, any additional openings in the torque box 140 are sealed using appropriate sealing features. The sealing of the torque box 140 in this manner minimizes fluid leakage into the torque box, and minimizes leakage of fluids out of the torque box.

Figure 3:
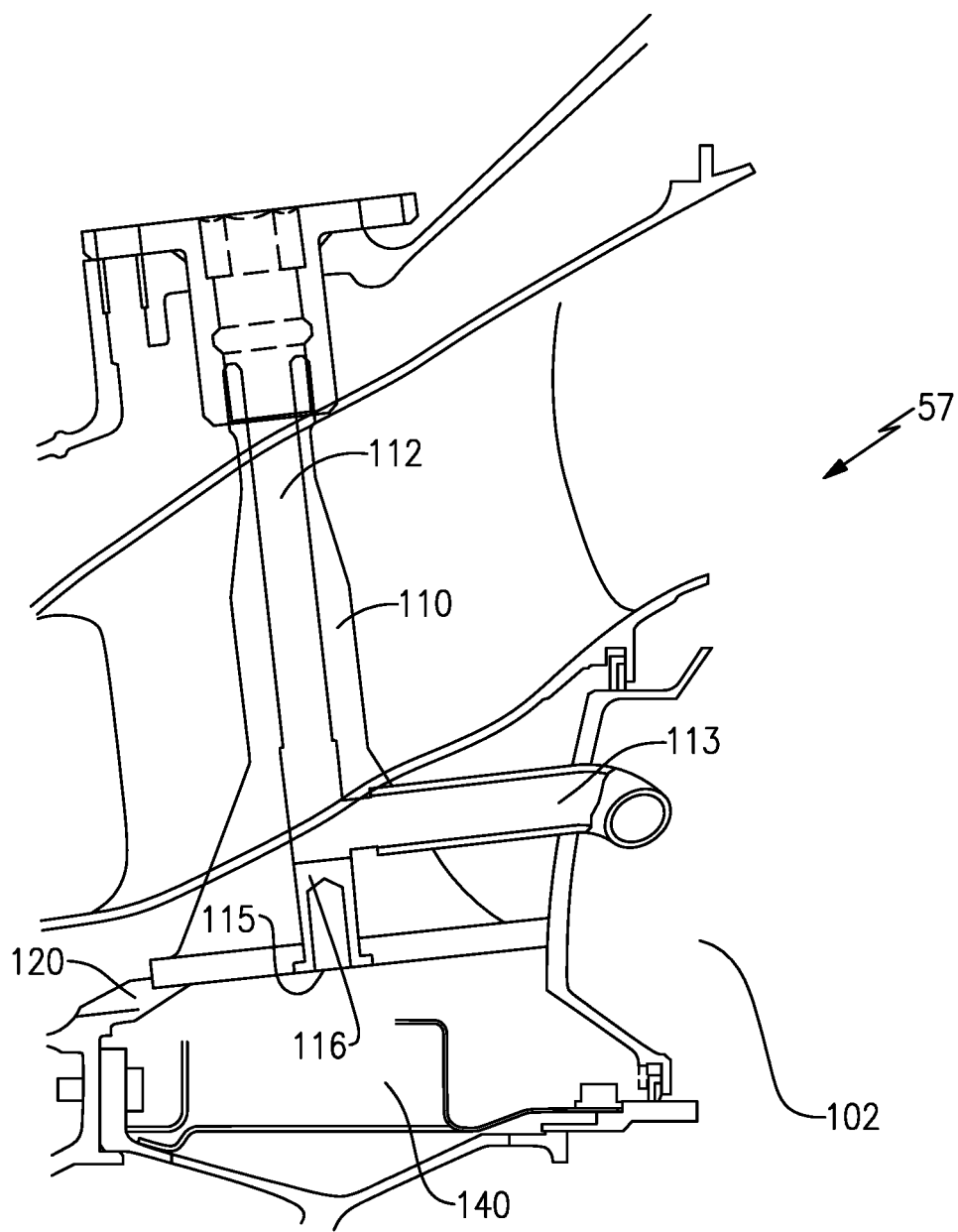
FIG. 3 schematically illustrates a radial cross sectional view of the exemplary mid-turbine frame of FIG. 2 along a spoke.

With continued reference to FIG. 2, and with like numerals indicating like elements, FIG. 3 schematically illustrates a cross sectional view of the exemplary mid-turbine frame 57 of FIG. 2 along cross section A-A. Illustrated in FIG. 3 is a single spoke 110 with the cooling passage 112 described above. A practical implementation will include multiple approximately identical spokes 110 distributed circumferentially about an axis defined by the mid-turbine frame 57. Disposed radially inward of the spoke 110, and defined by the inner frame case 120 is a torque box 140. A plug 116, or other seal element, blocks the radially inward end 115 of the cooling passage 112 through the spoke 110. The plug 116 completely seals the radially inward opening of the cooling passage 112. In alternative examples, the cooling passage 112 can extend only partially through the spoke 110 and there is no opening at the radially inward end 115. In such an example, the plug 116 is omitted.

Figure 4:
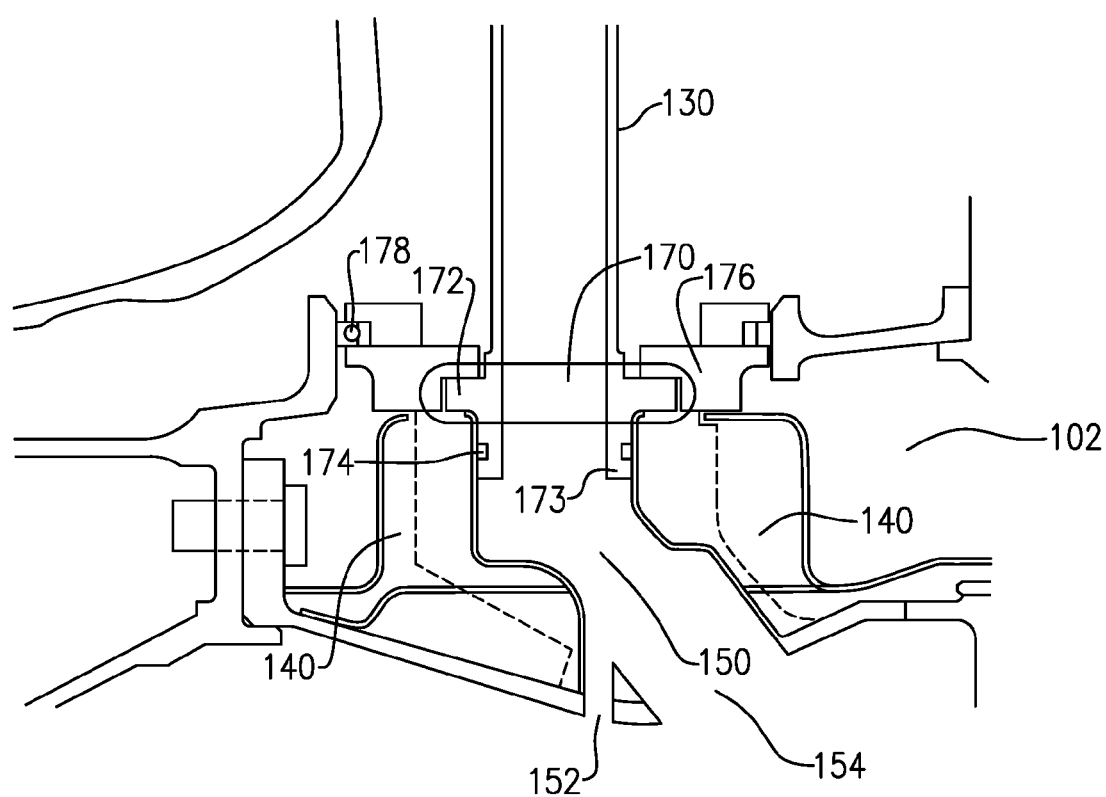
FIG. 4 schematically illustrates a radial cross sectional view of the exemplary mid-turbine frame of FIG. 2 along a service line.

In order to provide coolant to the low pressure turbine section 102, a coolant redirection tube 113 protrudes aft from the spoke 110 and provides a coolant flow path from the cooling passage 112 into the low pressure turbine section 102. By redirecting coolant flowing through the spoke 110, the illustrated mid-turbine frame 57 avoids passing coolant through the torque box 140 entirely. The torque box 140 also includes multiple service line pass throughs and bearing support passages that are out of plane in the cross section of FIG. 3. The exemplary bearing support passages are illustrated in FIG. 4, and are described below. The joint between the spoke 110 and the torque box 140 is sealed using any known seal type, thereby preventing fluid transferring into and out of the torque box 140.

With continued reference to FIGS. 2 and 3, and with like numerals indicating like elements, FIG. 4 schematically illustrates a radial cross sectional view of the exemplary mid-turbine frame 57 of FIG. 2 along cross section B-B. Cross section B-B is drawn radially along a service line 130, and illustrates the torque box 140, and bearing support passage 150 surrounded by the torque box 140.

The service line 130 includes a connection feature 170 including flanges 172 and a seal element 174. The connection feature 170 of the service line 130 connects to the bearing support passage 150 within the torque box 140. The service line connection feature 170 is sealed to the bearing support passage 150 via a seal element 174. The seal element 174 in the illustrated example is a piston seal. In alternative examples, any sealing element capable of sealing the service line 130 to the bearing support passage 150 can be utilized in place of the piston seal. The seal element 174 is disposed between an outward facing surface of an extension portion 173 of the service line connection feature 170 and an inward facing surface of the bearing support passage 150. The extension portion 173 extends into the bearing support passage 150. By sealing the interface between the service line 130 and the bearing support passage 150 in this manner, oil leaks from the service line 130 into the torque box 140 are minimized.

Disposed radially outward of the service line connection feature 170 is an inner frame case seal plate 176. The inner frame case seal plate 176 is sealed to the inner frame case via a piston seal 178. In alternative examples, alternative seal types capable of functioning in the mid-turbine frame environment could be utilized in place of the piston seal. The piston seal 178 prevents oil, and mid-turbine frame air, from outside of the inner frame case 120 from leaking into the torque box 140 through the interface between the connection feature 170 and the bearing support passage 150. The piston seal 178 also prevents any fluids within the torque box 140, from being passed out of the torque box 140 into the adjacent portions of the turbine engine.

The bearing support passage 150 inside the torque box 140 provides oil to a bearing supported by the mid-turbine frame 57. The radially inward openings 152, 154 through which the bearing support passage 150 passes are similarly sealed at each opening 152, 154, preventing flow into and out of the torque box 140 at the radially inward portion of the bearing support passage 150.

As a result of the sealing features described above with regards to FIGS. 3 and 4, the torque box 140 is a sealed torque box, and fluids are not communicated into or out of the torque box 140.

With continued reference to FIGS. 1-4, the above described configuration provides a configuration that is capable of minimizing the possibility for mid-turbine frame air from entering into the torque box 140. The possibility is further reduced by sealing the torque box from adjacent engine sections, and prevent the exchange of fluids between the torque box and adjacent engine portions including the cooling air flow being directed to the low pressure turbine. One of skill in the art, having the benefit of this disclosure will understand that while an ideal seal prevents all fluid exchange between both sides of the seal, practical seals will have a minimal amount of fluid exchange. Reference herein to minimized transfer of fluids across a seal is in reference to this practical reality.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A mid-turbine frame for a gas turbine engine comprising:
   an inner frame case defining a sealed torque box cavity;
   a plurality of spokes protruding radially outward from the inner frame case, each of said spokes including a cooling passage extending from a radially outward end of the spoke toward the inner frame case, wherein the cooling passage is sealed at a joint between the inner frame case and the spoke;
   at least one service line connected to the inner frame case; and
   wherein an opening between said cooling passage and said torque box at the joint between the inner frame case and the spoke is sealed via a plug seal.

2. The mid-turbine frame of claim 1, wherein said plurality of spokes are distributed circumferentially about said inner frame case, and wherein a joint between a radially inward end of each of said spokes and said inner frame case is sealed such that fluid transfer into said torque box at said joint is minimized.

3. The mid-turbine frame of claim 1, wherein each of said spokes further comprises a redirection tube directing cooling fluid flowing through said cooling passage aft such that said cooling fluid bypasses the torque box.

4. The mid-turbine frame of claim 3, wherein said redirection tube extends axially from a radially aligned portion of the cooling passage.

5. The mid-turbine frame of claim 1, wherein said at least one service line is connected to the inner frame case via a connection feature, the connection feature interfacing the service line with a corresponding bearing support passage in the torque box.

6. The mid-turbine frame of claim 5, wherein the connection feature includes:
   a flange portion and an extension portion, the extension portion extending radially into said bearing support passage;
   a seal plate radially outward of said flange portion; and
   a seal element sealing said seal plate to said inner frame case.

7. The mid-turbine frame of claim 6, wherein the seal element sealing said seal plate to said inner frame case is a piston seal.

8. The mid-turbine frame of claim 6, further comprising a service line seal disposed between an outward facing surface of said extension portion and an inward facing surface of said bearing support passage.

9. The mid-turbine frame of claim 5, wherein said bearing support passage includes at least a first opening for providing fluid from said bearing support passage to a component disposed radially inward of the mid-turbine frame.

10. The mid-turbine frame of claim 9, wherein said at least a first opening is sealed to said inner frame case, such that fluid passing through said opening does not pass into said torque box.

11. The mid-turbine frame of claim 1, wherein the inner frame case is configured such that all cooling air provided to an engine segment adjacent to said inner frame case bypasses the torque box.

12. A method comprising:
   sealing a torque box such that passage of fluid from a mid-turbine frame into said torque box is minimized, wherein the sealing includes at least sealing a cooling passage in a spoke at a joint between the spoke and an inner frame case of the mid-turbine frame, wherein sealing a cooling passage in a spoke at a joint between the spoke and an inner frame case comprises sealing a radially inward end of said cooling passage such that fluid is not exchanged between said torque box and said cooling passage;
   sealing said torque box such that passage of fluids inside said torque box to adjacent portions of a gas turbine engine is minimized; and
   providing cooling air to a turbine section through a mid-turbine frame, said cooling air bypassing a torque box of said mid-turbine frame by passing cooling air through the cooling passage in at least one spoke and redirecting said cooling air from said spoke to said turbine section via a redirection tube prior to said cooling air entering said torque box.

13. The method of claim 12, further comprising sealing every opening in said torque box.

14. A mid-turbine frame for a gas turbine engine comprising:
   an inner frame case defining a sealed torque box cavity;
   a plurality of spokes protruding radially outward from the inner frame case, each of said spokes including a cooling passage extending from a radially outward end of the spoke toward the inner frame case, wherein the cooling passage is sealed at a joint between the inner frame case and the spoke, each of said spokes further comprises a redirection tube directing cooling fluid flowing through said cooling passage aft such that said cooling fluid bypasses the torque box;
   at least one service line connected to the inner frame case; and
   wherein said redirection tube is fluidly connected to a radially aligned portion of the cooling passage upstream of the inner frame case.

* * * * *